United States Patent [19]

Duve

[11] Patent Number: 5,482,730
[45] Date of Patent: Jan. 9, 1996

[54] PROCESS FOR PREPARING A MEAT-BASED FOOD PRODUCT AND THE MEAT-BASED FOOD PRODUCT

[76] Inventor: Manfred Duve, Ebbetalstrasse 15, D-58840 Plettenberg, Germany

[21] Appl. No.: 272,140

[22] Filed: Jul. 8, 1994

[51] Int. Cl.⁶ .................................................... A23L 1/317
[52] U.S. Cl. ........................... 426/646; 426/511; 426/513
[58] Field of Search ...................................... 426/641, 646, 426/513, 511, 520, 523

[56] References Cited

U.S. PATENT DOCUMENTS

| | | | |
|---|---|---|---|
| 3,565,637 | 2/1971 | Artar | 426/646 |
| 4,058,633 | 11/1977 | Staff et al. | 426/646 X |
| 4,239,785 | 12/1980 | Roth | 426/646 X |
| 4,446,159 | 5/1984 | Roth | 426/513 X |
| 4,450,183 | 5/1984 | Steinberg et al. | 426/646 |
| 5,026,572 | 6/1991 | Neiberger | 426/513 X |

FOREIGN PATENT DOCUMENTS

| | | | |
|---|---|---|---|
| 472295 | 11/1974 | Australia | 426/646 |

*Primary Examiner*—Arthur L. Corbin
*Attorney, Agent, or Firm*—Collard & Roe

[57] ABSTRACT

A process for preparing a meat-based food product and a meat-based food product. The process includes pre-mincing lean beef and/or pork in a meat grinder and then finely mincing the meat in a cutter. Ice is added to cool the meat to break down the protein. Fat pork meat is added to the cooled meat which is then filled into molds. The meat in the molds is scalded with steam and subsequently cooled. The cooled meat is then cut into pieces and deep-fried or cooked with hot air before being vacuum-packed.

8 Claims, 3 Drawing Sheets

5,482,730

PROCESS FOR PREPARING A MEAT-BASED FOOD PRODUCT AND THE MEAT-BASED FOOD PRODUCT

BACKGROUND OF THE INVENTION

1. Field of the Invention

The present invention relates to a process for preparing a meat-based food product as well as the meat-based food product itself.

2. The Prior Art

Prior art processes combine lean beef meat and/or pork meat which are pre-minced in a meat grinder and subsequently finely minced in a cutter. The protein is broken down by adding crushed ice or snow to cool the mixture. Fat pork meat is then added to produce a finely ground meat which is used for frying sausages. The prepared sausage contents have the viscosity of cake dough and consequently are not dimensionally stable. As a result, the sausage content must be filled into natural guts or casings and then processed further.

It would be advantageous to provide a meat-based food product which is dimensionally stable and does not need to be packed into a casing. Furthermore, it would be advantageous to provide a meat-based food product that would have a relatively long shelf life.

SUMMARY OF THE INVENTION

It is, therefore, an object of the present invention to provide a process and a meat-based food product which would overcome the drawbacks of the prior art and be at least partially cooked to provide a relatively long shelf life.

It is a further object of the present invention to provide a process and a meat-based food product which does not contain protein substitutes, preservatives, or other additives.

It is a further object of the present invention to provide a process and a meat-based food product which has a superior consistency and texture and does not need to be packed into a casing.

These and other related objects are achieved according to the invention by preparing finely ground meat in a cutter and filling the meat into molds. The meat is then scalded with steam in a cooking oven at about 70° C. to 75° C. The temperature is selected so that the finely ground meat becomes firm and can be easily cut, without causing excessive scalding loss. After cooling, a firm mass is obtained which is cut into small pieces, for example, bar-shaped strips, cubes or other similar shapes. In order to provide the meat-based product with a relatively long shelf life, it is deep-fried in boiling fat for between one minute and a few minutes. The pre-fried product can then be marketed in suitable packaging. Prior to consumption, the food product is cooked by the consumer by deep-frying again or baking.

Alternatively, coarsely ground lean meat, ideally pork, is added to the finely ground meat after its preparation. The lean meat is mixed with the finely ground meat in a cutter at a lower speed. In this way, the product is stabilized and provided with a superior consistency or texture when bit into.

Ice or snow is added to the meat mixture for cooling in a manner known according to the prior art. The crushed ice or snow which is added during preparation of the finely ground meat partially contributes to the foreign water contained within the food product. The required spices are added to the meat mixture either at the start of the process or during the preparation of the finely ground mixture. After scalding, the product is cut into oblong strips, for example a few centimeters long, with a strip cutter or bacon cutter so that the product has the approximate shape of French fries.

In a further embodiment, a meat-based food product having a reduced fat content is produced by the process. The fat content can be reduced by up to 40% if the meat components of the finely ground mixture of the first process step are suitably varied with larger portions of meat having a lower fat content.

In a further embodiment, the meat-based food product is at least partially cooked in a hot-air furnace instead of deep-fried. The product is rotated during heating so that it is uniformly cooked and crisply browned over the surface.

Another embodiment, which is particularly suitable for industrial production of the product, includes loading the finely ground meat mixture into a vacuum filler having a vertically arranged grinder connected at its outlet. The finely ground meat mixture is forced through a perforated grinder plate to form strands which are cut into strips a few centimeters long by a re-rotating knife or a rotating cutting wire arranged below the grinder plate. The cut strips drop into a water bath arranged below the grinder and are scalded. In a subsequent step, the scalded strips are deep-fried in boiling fat for a relatively short period of time.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

EXAMPLE 1

A finely ground meat mixture is prepared in a first step. This preparation is based on a batch of 100 kg (meat mass) with the following meat components:

15 kg beef meat—category R III*

25 kg pork meat—category S III*

15 kg pork buttocks—category S IV*

15 kg bacon—category S VIII* *) The above categories correspond with the classification of meat grades usually applied in the meat trade based on connective tissue content, protein content, fat content etc.

In addition, a total of 20 kg ice is added for cooling.

Figure 4:
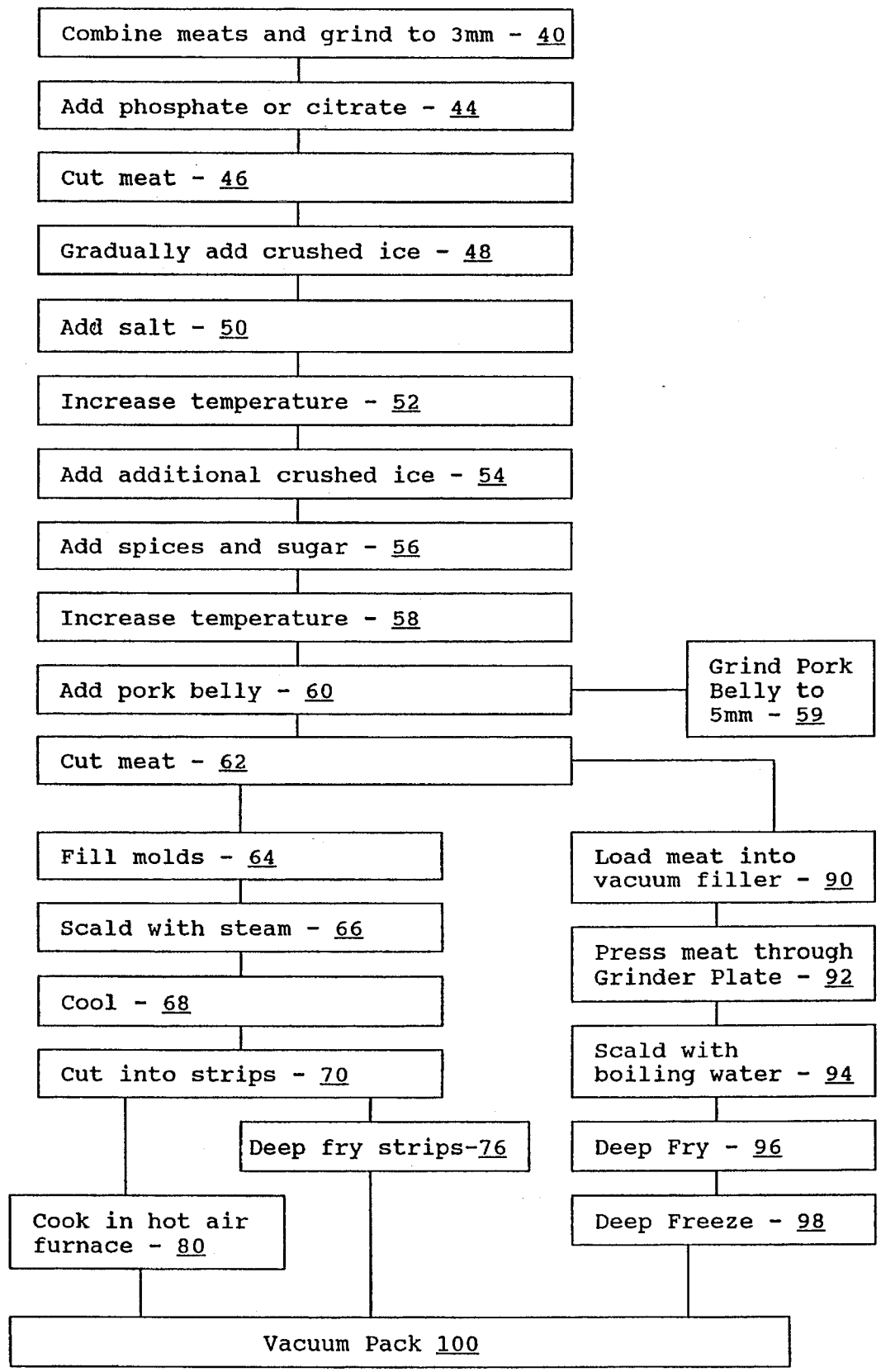
FIG. 4 is a flow chart describing the various processing steps according to the invention.

The finely ground meat mixture is prepared based on the meat components specified in the above table as follows, with reference to FIG. 4:

The well-cooled meat components are combined in step 40 and passed through a meat grinder and ground therein to a size of 3 mm. About 300 g phosphate or citrate (this conforms to an amount of 3 g per kg based on the total batch) is added to the pre-minced mixture, in step 44, in the meat grinder. The ground meat is then passed into a cutter in step 46, and one third of the total amount of crushed ice (thus about 6.6 kg) is gradually added during cutting in step 48. The cutter operates with a rotary speed of up to about 4000 rpm, for example. It is possible to use, for example, a commercially available cutter model 330 of the HOEGGER ALPINA company. Then, 2 kg common salt is added in step 50 (which conforms to an amount of 20 g per kg total batch). The mixture is then cut until the temperature has increased to 6° C. to 8° C. in step 52.

Subsequently, the remaining two thirds (thus about 13.4 kg) of ice is gradually incorporated in step 54. Thereafter, 400 g to 600 g of a spice mixture is added in step 56 (which conforms to an amount of 4 g to 6 g per kg of the total batch). In addition, sugar substances are added in order to provide the mixture with color or tint. Thereafter, cutting is continued until the temperature of the frying material has again risen to 10° C. in step 58. The total cutting time can come to about 4 to 6 minutes. However, the cutting time is subject to variations depending on the composition of the meat components of which the material is based and also on machine parameters, for example, on the sharpness of the knifes.

After the cutting process has been completed, 10 kg pork belly of category S V is added to the finely ground meat mixture in step 60. The pork belly is first ground in a meat grinder to a size of 5 mm in step 59. The pork belly is incorporated in the frying material in order to provide the latter with superior texture or consistency when bit into. This can be carried out in the cutter, which is operated at a low number of revolutions, in step 62.

The frying material is now filled in molds in step 64 and immediately after its preparation scalded with steam in a cooking furnace at 75° C. in step 66. Following the scalding process, the mass is first permitted to cool slightly at room temperature, and then cooled down in the refrigeration room in step 68 so that the mass is well-firm for cutting. Subsequently, the mass is cut into bar-like strips by means of a strip cutter in step 70, such strips having about the shape of French fries. Finally, said small bars are deep-fried in boiling fat at about 180° C. about one minute in step 76. The "meat fries" prepared according to the invention can be vacuum-packed in step 100 and marketed in the food trade and are, in this way, durable for a relatively long time.

EXAMPLE 2

A finely ground meat mixture is prepared in a first step. This preparation is based on a batch of 100 kg (meat mass) of the following meat components:

14 kg beef meat—category R III
30 kg pork meat—category S III
6 kg bacon—category S VIII
16 kg pork buttocks—category S IV In addition, a total of 20 kg ice is added for cooling.

The finely ground meat is prepared on the basis of the above meat components in a way similar to the procedure specified in Example 1. The well-cooled meat components are loaded into a meat grinder and ground therein to a size of 3 mm. A suitable amount of phosphate or citrate is added to the preminced material in the meat grinder. The ground meat is subsequently processed in a cutter, whereby about one third of the crushed ice is gradually added during cutting. The cutter specified in connection with Example 1, for example, can be used. Also, the cutting process can be carried out as specified in Example 1. A total of 4 kg of salt, spices and cutting auxiliaries is added during the preparation of a batch of 100 kg meat mass.

After the cutting process has been completed, 10 kg pork belly of category S IV is added to the finely ground meat mixture, as specified in Example 1. The pork belly is first ground in a meat grinder to a size of 5 mm. The pork belly is incorporated in the finely ground meat mixture, which can be accomplished in the cutter at a lower number of revolutions.

Subsequently, the finely ground meat mixture is filled in molds and, following its preparation, scalded with steam in a cooking furnace at 75° C. Following the scalding process, the mass is first permitted to slightly cool down at room temperature, and then cooled down in the refrigeration room, so that the mass is well-firm for cutting. Thereafter, the mass is cut by means of a strip cutter into bar-like strips having about the shape of French fries. Finally, the small bars are heated in a hot-air furnace and rotated so that the surface is uniformly browned on all sides in step 80.

With the batch described in the above example, a food product based on meat is obtained which has as significantly reduced fat content as compared to the food product specified in Example 1.

EXAMPLE 3

In the following, the preparation of a food product according to the invention is described according to a variation of the process of the invention, said variation being particularly suitable for the industrial production of said product on a production line.

A finely ground meat mixture is produced in a first step. This production is based on a batch of 100 kg (meat mass) of the following meat components:

15 kg beef meat—category R III
25 kg pork meat—category S III
15 kg pork buttocks—category S IV
15 kg bacon—category S VIII In addition, a total of 20 kg ice is added for cooling.

The finely ground meat mixture is prepared based on the meat components specified in the table as follows:

The well-cooled meat components are loaded into a meat grinder and ground therein to a size of 3 mm. About 300 g phosphate or citrate (which conforms to an amount of 3 g per kg based on the total batch) is added to the pre-minced material in the meat grinder. The ground meat is then passed into a cutter, and about one third of the crushed ice (thus about 6.6 kg) is gradually incorporated during cutting. The cutter operates at a rotary speed of the knifes of up to about 4,000 rpm, for example. It is possible to use, for example, a commercially available cutter Model 330 of the HOEGGER ALPINA company. Then, 2 kg common salt (which conforms to an amount of 20 g per kg total batch) is sprinkled in. The mass is subsequently cut until the temperature has increased to 6° C. to 8° C.

Thereafter, the remaining two thirds of ice (thus about 13.4 kg) are gradually added. Subsequently, 400 g to 600 g of a spice mixture is added (which conforms to an amount of 4 g to 6 g per kg of the total batch). In addition, sugar substances are added in order to provide the finely ground meat mixture with color or tint. Subsequently, cutting is continued until the temperature of the frying material has again risen to 10° C. The total cutting process can last about 4 to 6 minutes. However, the cutting time is subject to variations depending on the composition of the meat components on which the material is based, as well as on machine parameters, for example on the sharpness of the knifes.

After the cutting process has been completed, 10 kg pork belly of category S V is added to the finely ground meat mixture. The pork belly is first ground in the meat grinder to a size of 5 mm. The pork belly is incorporated in the frying material in order to provide the latter with a superior texture and consistency when bit into. This can be accomplished in the cutter, which is operated at a lower number of revolutions.

Figure 1:
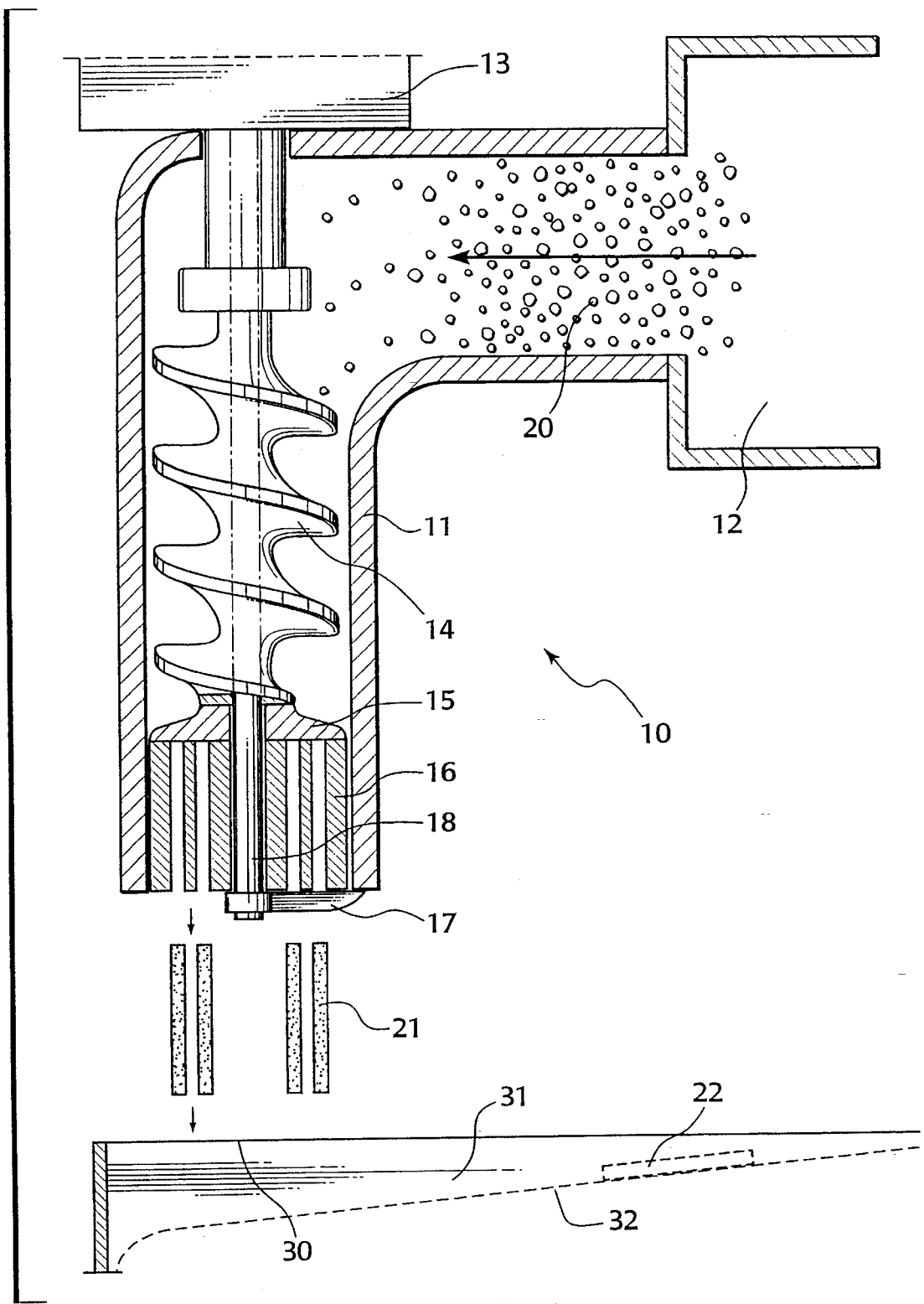
FIG. 1 is a side-elevational view, in part cross section, of the vacuum filler outlet equipped with a grinder attachment for forming strips of a meat mixture.
Figure 2A:
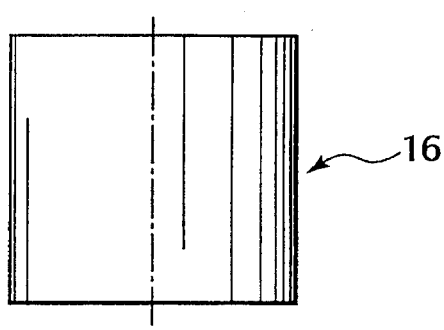
FIG. 2A is a side-elevational view of a grinder plate.
Figure 3A:
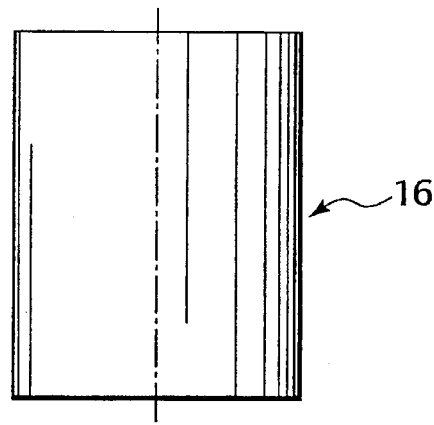
FIG. 3A is side-elevational view of an alternate embodiment of a grinder plate.
Figure 2B:
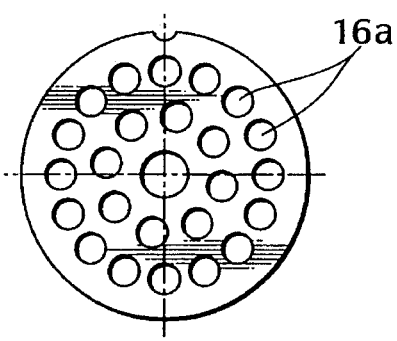
FIG. 2B is a top plan view of the grinder plate of FIG. 2A.
Figure 3B:
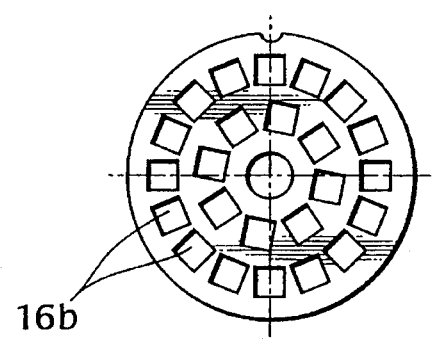
FIG. 3B is a top plan view of the grinder plate of FIG. 3A.

The preparation of the frying material thus is carried out first in the same way as specified in Example 1. Subsequently, the frying material is loaded into a so-called vacuum filler in step 90 which, for example, is used also for the portioning of frying material or for filling frying material into sausage casings during the manufacture of frying sausages. However, as can be seen in FIG. 1, the outlet of said vacuum filler 12 contains a special front attachment 10. Said front attachment 10 comprises a housing 11 with a vertically arranged grind worm 14, beneath which a perforated disk or grinder plate 16 is arranged, through which the frying material 20 is pressed in step 92 by means of grind worm 14.

As is shown in FIGS. 2A, 2B, 3A and 3B, holes 16a, 16 in grinder plate 16 can be round or square—important in this connection is only that said holes are sufficiently spaced from each other so that frying material 20, after passing through grinder plate 16, forms strands 21 in such a way that the latter are cleanly separated from each other and without coming into contact with each other. Grinder plate 16 is disposed, for example, in a cylindrical housing 11 in which grind worm 14 is arranged above grinder plate 16. Beneath the grinder plate, at the lower end of cylindrical housing 11, where strands 21 of the meat frying material exit from said housing, provision is made for a rotating knife 17 or a cutting wire for cutting strips 22 of a few centimeters length from vertically exiting strands 21 of the meat frying material.

FIGS. 2A, 2B, 3A and 3B show that the thickness of grinder plates 16 can be varied which permits changing the length of cut strips 22 of the meat frying material. An additional knife 15 is arranged above grinder plate 16 in order to clean the top side of grinder plate 16 from connective tissue. Knife 15, grind worm 14 as well as knife 17 can be driven by motor 13 via a common shaft 18.

Strips 22 subsequently drop into a water bath 30 arranged below the portioning device of the vacuum filler, said bath being filled with boiling water 31, in which said strips are scalded in step 94. Preferably, a chain conveyor belt 32 is arranged in said water bath 30, said belt being permeable to water. Strips 22 drop onto said belt. The end of chain conveyor belt 32, onto which strips 32 to be scalded drop, is disposed lower than the other end of the conveyor belt. This means that the conveyor belt, which, for example, can run endlessly across two sprocket wheels, is arranged sloped so that it forms an inclined plane. Strips 22 of the frying material, to be scalded, are successively transported upwardly, starting from the point where they drop onto the belt so that they exit from the surface of boiling water 31 at the other end of chain conveyor belt 32.

The scalded strips of the food product subsequently drop via a slide or the like onto a second chain conveyor belt of a similar type which is disposed in a bath with boiling fat, said bath being arranged downstream of the water bath in the direction of conveyance. The second bath is not shown in the drawing. In said second bath, the food product is deep-fried for a short period of time in step 96. The chain conveyor belt arranged in said deep-frying bath again forms an inclined plane in the way described above.

At the end of said conveyor belt, the finished, i.e. deep-fried, food product drops onto another conveyor belt and travels on the latter a distance that serves for dripping off the fat. If necessary, a blower can be additionally used in said fat drip-off zone in order to accelerate the drop-off and drying process. Subsequently, the strip-shaped food product is received in a so-called run-through froster in which a similar conveyor belt forming an inclined plane can be arranged. Deep-freezing of the food product, for example at −40° C. or at a lower temperature, is accomplished in said run-through froster in step 98. After leaving the run-through froster, the finished food product is received in a packaging line where it is vacuum-packed in step 100.

While several embodiments of the present invention have been shown and described, it is to be understood that many changes and modifications may be made thereunto without departing from the spirit and scope of the invention as defined in the appended claims.

What is claimed is:

1. A process for preparing a meat-based food product, comprising the steps of:
   pre-mincing meat in a meat grinder, the meat being selected from the group consisting of lean beef, pork and a
   finely mincing the meat in a cutter at a first speed;
   adding crushed ice to cool the minced meat and break down protein in the meat;
   adding fat pork meat to the cooled meat;
   filling the cooled meat into molds;
   scalding the cooled meat in said molds with steam in a cooking furnace at about 70° C. to 75° C.;
   cooling the scalded meat so that it is firm;
   cutting the firm, molded and cooled meat into French fry size pieces; and then
   heating and rotating the meat pieces in a hot-air furnace.

2. The process of claim 1,
   further comprising mincing the meat in the cutter at a second speed slower than the first speed.

3. The process of claim 2, further comprising the steps of:
   adding phosphate to the pre-minced meat prior to said step of finely mincing the meat;
   adding salt to the meat following said step of adding crushed ice; and
   adding spices to the meat following said step of adding salt.

4. The process of claim 3, wherein sugar substances are added to the meat following said step of adding salt.

5. The process of claim 4, wherein the scalded meat is cut into French fry size pieces with a strip cutter.

6. The process of claim 5, comprising:
   adding lean pork meat to the cooled meat, wherein the amount of lean pork meat exceeds the amount of fat pork meat to obtain a reduced fat food product.

7. The process of claim 1, wherein said step of cooling the scalded meat comprises:

cooling the scalded meat at room temperature; and then
   cooling the scalded meat by refrigeration.

8. A meat-based food product as prepared according to a process as claimed in claim 1.

* * * * *